Aug. 8, 1950     A. G. JUNG     2,518,018
PIPE WRENCH TOOTH SHARPENER AND CUTTING TOOL
Filed July 19, 1948     3 Sheets-Sheet 1
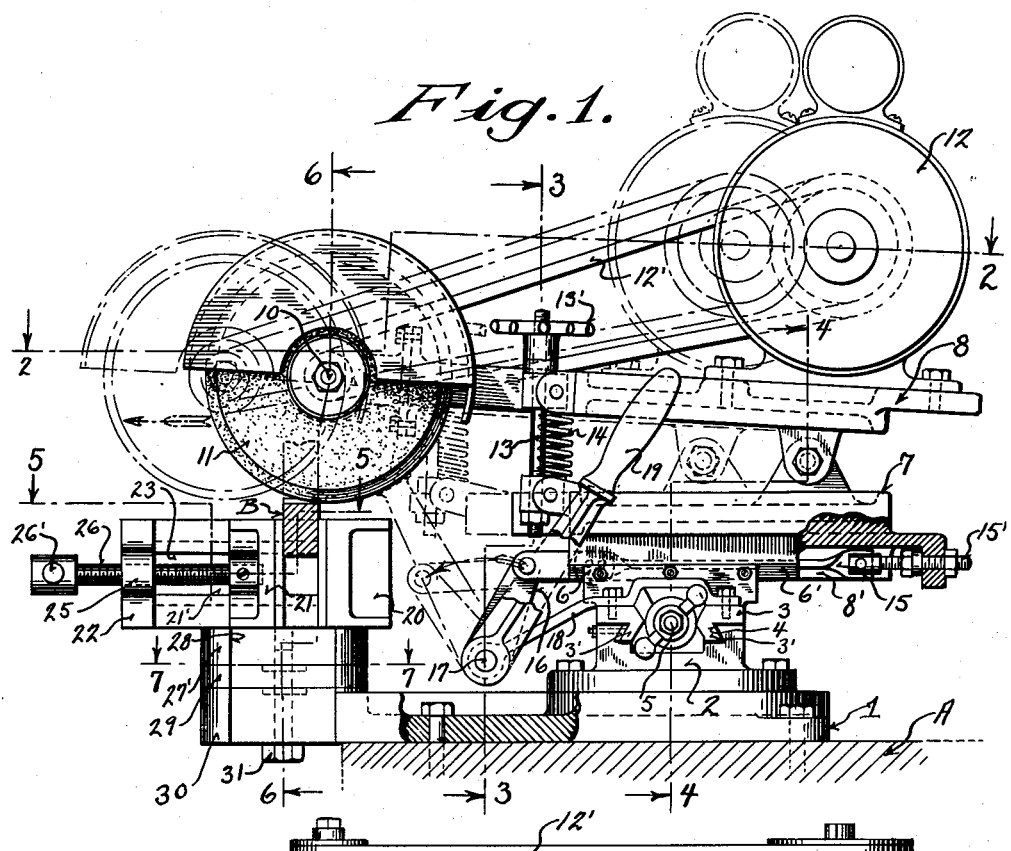
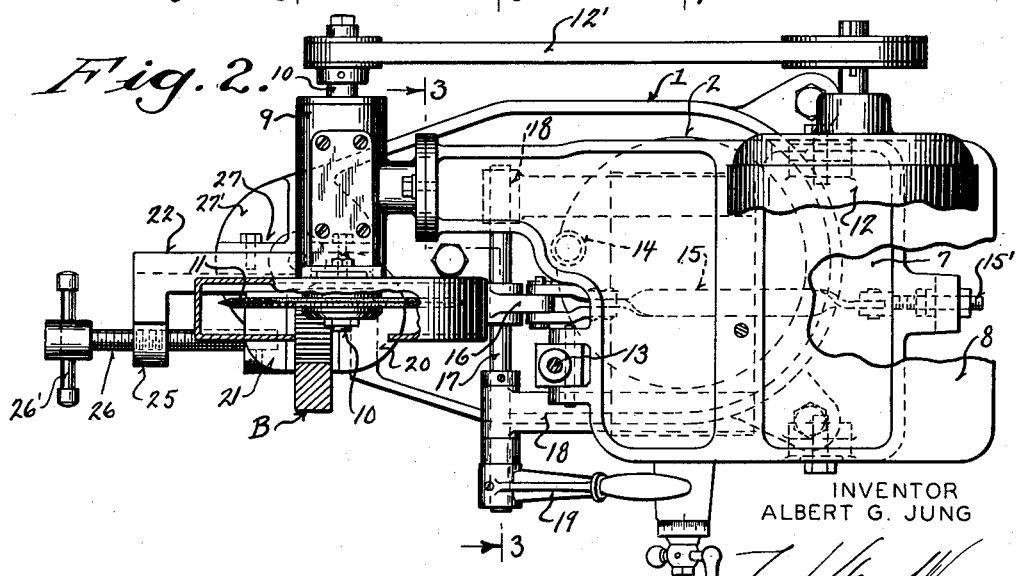
INVENTOR
ALBERT G. JUNG
BY
ATTORNEYS

INVENTOR
ALBERT G. JUNG

Aug. 8, 1950 A. G. JUNG 2,518,018
PIPE WRENCH TOOTH SHARPENER AND CUTTING TOOL
Filed July 19, 1948 3 Sheets-Sheet 3
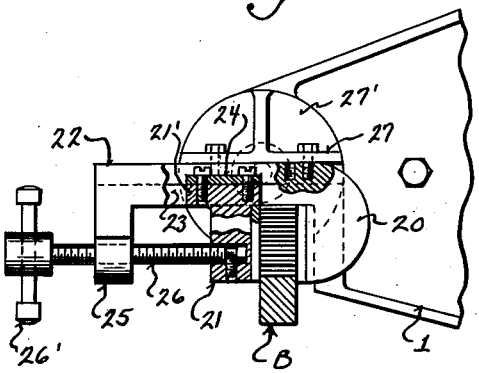
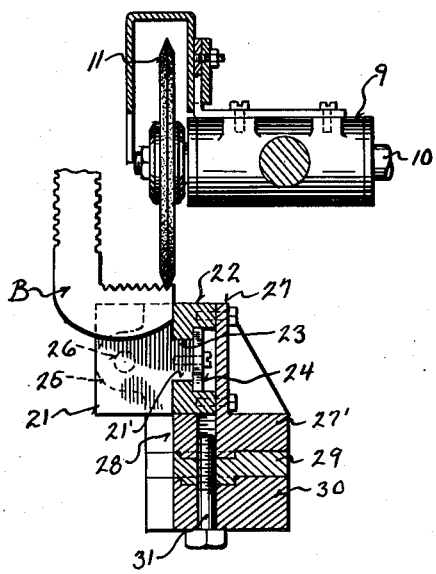
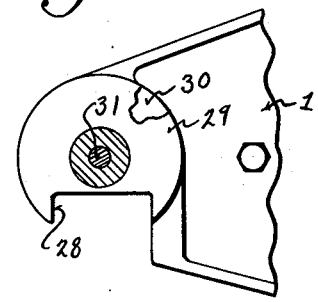
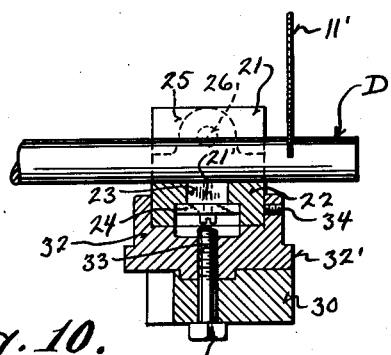
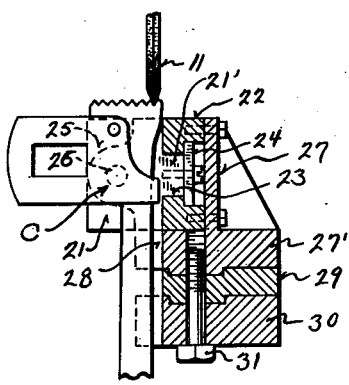
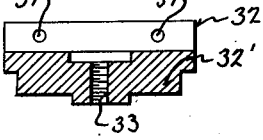
INVENTOR
ALBERT G. JUNG
BY 
ATTORNEYS Patented Aug. 8, 1950

2,518,018

UNITED STATES PATENT OFFICE 2,518,018

PIPE WRENCH TOOTH SHARPENER AND CUTTING TOOL

Albert G. Jung, Burlington, Wis.

Application July 19, 1948, Serial No. 39,407

3 Claims. (Cl. 51—34)

My invention refers to combination power driven tools for sharpening the biting teeth of any type of pipe wrench and for cutting tubes, rods, bars or the like, into different lengths.

The primary object of my invention is to provide a base having an adjustable vise-head, associated with a driven cutting or grinding wheel, which wheel is mounted upon a bed that imparts both transverse and longitudinal reciprocation to said wheel, whereby the rows of teeth of wrench jaws are quickly sharpened.

A further object of my invention is to provide means for changing the position of the vise-head, relative to the cutting wheel, whereby pipes, rods, or other standard products may be cut into predetermined lengths.

A further object of my invention is to provide a threaded spindle in connection with a slidable bed piece, whereby the cutting wheel, carried by the same, is adjusted back and forth, relative to the work, in conjunction with a crank connection between the bed and cutting wheel supports, whereby said cutting wheel is reciprocated longitudinally with reference to the work.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings:

Fig. 1 represents a side elevation of a cutting tool embodying the features of my invention, with parts being broken away and in section to more clearly illustrate structural features.

Fig. 2 is a sectional plan view of the same, the section being indicated by line 2—2 of Fig. 1.

Fig. 5 is a detail plan sectional view through the front end of the tool illustrating vise-head gripping means for the work, the section being indicated by line 5—5 of Fig. 1.

Fig. 6 is another cross sectional view through the vise-head end of the machine, the section being indicated by line 6—6 of Fig. 1 and showing the fixed toothed jaw of a pipe wrench.

Fig. 7 is a detail sectional view through the base support of the vise-head, the section being indicated by line 7—7 of Fig. 1.

Fig. 8 is a cross sectional view through the vise-head mechanism upon the same plane as that indicated with reference to Fig. 6 of the drawings, the same particularly illustrating the movable toothed jaw of a pipe wrench.

Fig. 9 is a cross sectional view through the vise-head mechanism in a changed position for clamping a length of pipe to be cut in sections, having a vise-head support nest attached to the bed; and Fig. 10 is a detail sectional side elevation of said nest.

Referring by characters to the drawings, 1 indicates a machine base, suitably attached to a table A. The base has extended upwardly therefrom a channel or grooved pad 2 projecting from its rear end. The pad carries a bed 3, provided with ribs 3' upon its lower face, which ribs are slidable in dove-tailed engagement with the rails 4 of the bed 3, the same being connected to the pad 2 through an ear 2' extending therefrom and in threaded engagement with a cranked rod 5 carried by the bed 3.

Figure 3:
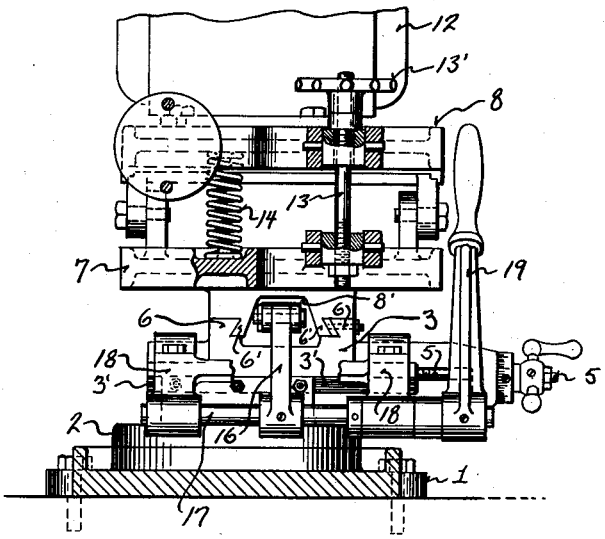
Fig. 3 is a cross sectional view of the tool, the section being indicated by line 3—3 of Figs. 1 and 2.
Figure 4:
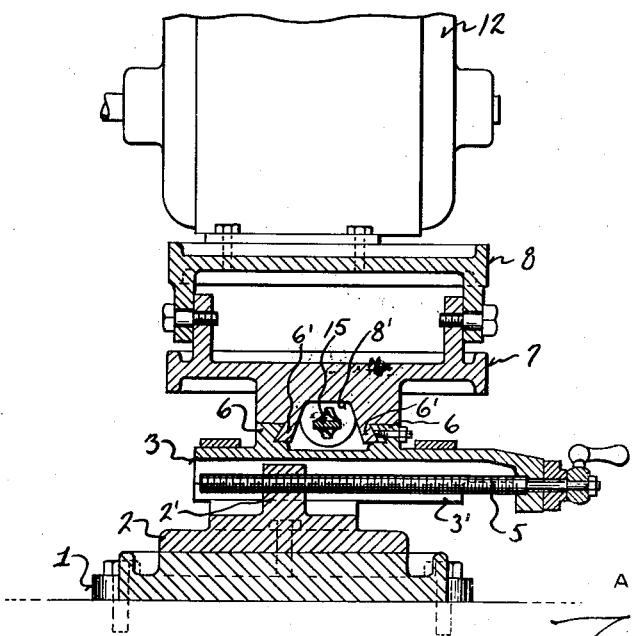
Fig. 4 is another cross sectional view through the tool, the section being indicated by line 4—4 of Fig. 1.

As best shown in Figs. 1, 2, and 3 of the drawings, the upper face of the bed 3 has extending therefrom transversely disposed rails 6, which rails are in dove-tailed engagement with longitudinally disposed rails 6' depending from a supporting shelf 7.

Pivotally mounted upon the rear end of the supporting shelf 7 is a rocker-arm 8, and secured to the front end of said rocker-arm is a transversely disposed sleeve 9, the said sleeve serving as a journal for a shaft 10, which shaft, at its front end, has secured thereto a cutting wheel 11, the same being usually fabricated from any suitable abrasive material, having a V-shaped cutting edge.

Power is applied to the cutting wheel 11 by a motor 12, suitably secured to the rear end of the rocker-arm, and said motor imparts power to the cutting wheel by a belt 12' trained over pulleys upon the motor shaft and wheel shaft 10.

The forward ends of the rocker-arm 8 and supporting shelf 7 are connected by a tie-rod 13 having its upper end in threaded union with an adjusting wheel 13', it being understood that the said rocker-arm and supporting shelf are spread apart, with reference to their pivot connection, by a coil spring 14, which spring is interposed between the faces of the arm and shelf, as best indicated in Figs. 1 and 3 of the drawings.

By particular reference to Figs. 1 and 3 of the drawings, it will be noted that the supporting shelf 7 is provided with a central groove 8' therein and nested within this groove is a strap 15, the rear end of which is in pivotal union with a bolt 15' that is carried by a lug extending downwardly from the shelf.

The front end of the strap 15 is in pivotal union with a lever 16, which lever extends upwardly from a shaft 17. The shaft 17 is journaled in bearing ears 18 that extend forwardly from the upper face of the bed 3 and one end of said shaft carries a hand crank 19.

Due to the above described coupling connection between the crank shaft 17 and supporting shelf, it will be noted that when the crank 19 is actuated back and forth, it will cause the supporting shelf and associated rocker arm and cutting wheel 11 to move longitudinally backwardly and forwardly, whereby said wheel will travel across a selected tooth of a series that comprise the fixed jaw element B of a pipe wrench, as best indicated in Figs. 1 and 3 of the drawings.

In the above referred to sharpening movement of a wrench tooth, it should be noted that after the wheel 11 has moved back and forth for a sufficient number of strokes, the said wrench tooth will then be properly sharpened.

In the next sharpening step of the wheel, the rod carrying adjusting wheel 13' is rotated, whereby the rocker arm, under its spring tension, will lift to thus raise the cutting edge of the wheel 11 clear of the wrench head tooth.

After the above movement of the cutting wheel, it must be transversely shifted to the next tooth of the wrench head for sharpening purposes. To accomplish the desired shifting movement of the wheel, the cranked rod 5 is slightly rotated, whereby the bed 3 will shift transversely and thus align the cutting edge of the wheel 11 with the next tooth cavity of the wrench head B, it being understood that in sharpening the series of teeth, the head B is firmly held between a fixed jaw 20 and a movable jaw 21 of a vice-head.

As best shown in Figs. 1, 5 and 6 of the drawings, the fixed jaw 20 extends forwardly from a rectangular base 22 and said base is formed with a shouldered channel 23, into which a shank 21' of the movable jaw 21 extends and said movable jaw is held in its adjusted position by a cap 24 which is secured to the shank of the movable jaw.

The outer end of the rectangular base 22 of the vise-head has extended forwardly therefrom a lug 25 provided with a threaded aperture for the reception of a correspondingly threaded spindle 26, the inner end of which spindle is freely rotatable and confined in an aperture of the movable jaw 21, the outer end of this spindle terminating with a handle 26', whereby upon rotation of said spindle, the movable vice jaw will be shifted back and forth, to free or grip the wrench head B between the vise-head jaws.

The vise base 22 is secured to a bracket 27, having a circular bed 27', the same being interrupted by a rectangular opening 28. The bracket bed 27' is nested within a spacing ring 29, which ring coincides with the bed 27' and is simply provided for the purpose of elevating the vise-head. The ring 29, in turn, coincides with a ring terminal 30, which forms an extension of the base 1. The bracket bed 27', spacing ring 29, and ring terminal 30 are each provided with central apertures for the reception of a pivot bolt 31, whereby the nested parts are horizontally adjusted and firmly clamped to align the wrench heads for sharpening purposes.

As shown in Fig. 8 of the drawings, the adjustable wrench head C, which is detached from the head B, is fitted into the vise-head and securely clamped for sharpening the teeth of said adjustable wrench head.

Obviously, while I have described the tool in connection with sharpening spanner wrench head teeth, I may, with certain refinements, also sharpen the teeth of saws or the like, under which conditions it is understood that the cutting edge of the wheel 11 is varied.

Referring now especially to Fig. 9 of the drawings, when it is desired to cut pipe, or the like, into lengths, I provide a rectangular trough 32, having a circular base 32', which base is provided with a threaded aperture 33, for the reception of the pivot bolt 31, that clamps the trough to the extension ring 30 of the base 1. The vise-head base 22 is then inserted in the trough and secured thereto by set bolts 34, it being understood that this vise-head mounting will reverse the position of the jaws thereof to present gripping faces in a horizontal position in contradistinction to their vertical position, as shown in Fig. 1 of the drawings.

The tube or work D is then clamped within the vise at a right angle to the cutting edge of the wheel 11', which wheel, in this operation, may be fabricated from metal and provided with a saw toothed cutting edge.

I claim:

1. A tool of the character described, comprising a machine base, a ring extending from the machine base, a bracket having a circular bed rotatably mounted upon the ring, a vise-base secured to the bracket, having a channel therein and a fixed jaw extending from one end of the vise-base, a movable jaw slidably engaging the vise-base channel, a lug extending from the other end of the vise-base, a threaded spindle adjustably mounted in the vise-base lug and connected to the movable jaw, whereby a piece of work is held between the jaws and rotatably adjusted for cutting teeth at various angles in the piece of work, a bed slidably mounted upon the machine base, means for adjusting the same transversely of the machine base, a shelf mounted upon the bed having means for adjusting the same longitudinally of said machine base, a rocker arm mounted upon the shelf, means for vertically adjusting the rocker arm, and a cutting wheel carried by the rocker arm positioned over the vise base.

2. A tooth sharpening tool, comprising a base having a transversely disposed ribbed pad, a bed slidably mounted between the pad ribs, a supporting shelf slidable with the bed and in tongue and groove engagement with the bed, a manually actuated crank shaft journaled in the front end of said bed, a rocker arm pivoted to the rear end of the supporting shelf, a strap connecting the rear end of the shelf and crank arm, whereby the shelf and rocker arm may be moved back and forth and means carried by the said shelf for vertically adjusting the rocker arm, a motor driven cutting wheel journaled upon the front end of the aforesaid rocker arm, and a work holding vise-head mounted upon the base under the cutting wheel.

3. A cutting tool comprising a base having a vise-head support at its front end, a jawed vise adjustably mounted thereon adapted to receive work, a bed in transversely disposed slidable engagement with the base, means for shifting and holding the bed in selected positions, a supporting shelf mounted upon said bed in longitudinally disposed slidable engagement with said bed, a manually actuated crank shaft mounted upon the machine base, a strap connecting the rear end of the shelf and crank shaft, a rocker arm in pivotal connection with the rear end of said shelf, a transversely disposed sleeve extending from the front end of the rocker arm, a cutting wheel having a shaft journaled in the sleeve above the jawed vise, a motor mounted upon the rear portion of the rocker arm in drive belt connection with the cutting wheel shaft, spring means normally tending to swing the rocker arm to a raised position on its pivot, a threaded rod carried by the front end of the shelf, and a nut threaded on said rod engaging the rocker arm for moving the rocker arm down to an adjusted position against the tension of said spring means.

ALBERT G. JUNG.

REFERENCES CITED

The following references are of record in the file of this patent:

UNITED STATES PATENTS

| Number | Name | Date |
| --- | --- | --- |
| 1,182,615 | Armstrong | May 9, 1916 |
| 2,418,737 | Talboys | Apr. 8, 1947 |